(12) United States Patent
Perrinel

(10) Patent No.: US 12,346,823 B2
(45) Date of Patent: Jul. 1, 2025

(54) HIGH-DIMENSIONAL TRANSFER LEARNING

(71) Applicant: Matterport, Inc., Sunnyvale, CA (US)

(72) Inventor: Matthieu Francois Perrinel, Berkeley, CA (US)

(73) Assignee: Matterport, Inc., Sunnyvale, CA (US)

( * ) Notice: Subject to any disclaimer, the term of this patent is extended or adjusted under 35 U.S.C. 154(b) by 443 days.

(21) Appl. No.: 18/048,427

(22) Filed: Oct. 20, 2022

(65) Prior Publication Data

US 2023/0117227 A1    Apr. 20, 2023

Related U.S. Application Data

(60) Provisional application No. 63/257,983, filed on Oct. 20, 2021.

(51) Int. Cl.
*G06N 3/096*     (2023.01)
*G06V 10/764*   (2022.01)
*G06V 10/774*   (2022.01)
*G06V 10/82*    (2022.01)

(52) U.S. Cl.
CPC ........... *G06N 3/096* (2023.01); *G06V 10/764* (2022.01); *G06V 10/774* (2022.01); *G06V 10/82* (2022.01)

(58) Field of Classification Search
None
See application file for complete search history.

(56) References Cited

U.S. PATENT DOCUMENTS

2020/0097850 A1*  3/2020  Bae ................. G06N 20/20
2023/0078218 A1*  3/2023  Wang ............... G06N 3/098
                                                    706/12

* cited by examiner

*Primary Examiner* — Leon Flores
(74) *Attorney, Agent, or Firm* — Ahmann Kloke LLP

(57) ABSTRACT

An example method comprises applying learning (e.g., weights) developed for training a first model for a first data set of image data to training a second model for a second data set of sensor data. The first and the second data sets may be from the same environment. The second data set has a greater number of channels than the first data set. Weights of layers determined in the first model training may be initially applied to training the second model for the second set of data. Channels of the second data set equal to the number of channels of the first data set may be utilized for each of the layers, using the same weights from the first model. All or some of the channels may be applied in training the second model and using the layers, but determining new weights for the generation of the second trained model.

18 Claims, 10 Drawing Sheets

HIGH-DIMENSIONAL TRANSFER LEARNING

CROSS-REFERENCE TO RELATED APPLICATIONS

The present patent application claims priority from U.S. Provisional Patent Application No. 63/257,983, entitled "High Dimensional Transfer Learning," filed Oct. 20, 2021, which is incorporated by reference herein.

FIELD OF THE INVENTION(S)

The present invention(s) generally relates to systems and methods for transfer learning for training one model based on another pre-trained model and, more particularly utilizing information from one trained model for training a new model for different sensor data with additional channels.

BACKGROUND

Typically, when training models for machine learning, completely new models must be trained for every data set using different sensors. For example, different sensors types may be used to obtain information regarding the same environment. Data from the different sensor types require different models which are trained separately to obtain information about the environment. For example, image and LiDAR data may be obtained regarding the same environment. A classification model and/or an object detection model is developed and trained for the image data and a second classification model and/or a second object detection model is developed and trained for the LiDAR data. Information from one model (e.g., configurations and weights) are not used between models.

SUMMARY

An example method comprises receiving a first image data set and a second sensor data set, the first image data set being based on images of a first environment, the second data set being measurements taken by sensors of the first environment, the first image data set having a first number of first channels, the second sensor data set having a second number of second channels, the second number of second channels being greater than the first number of first channels, training a first image model using the first image data set, the first image model including a plurality of layers, a first layer of the plurality of layers receiving predetermined dimensions and the first number of first channels of the first image data set, subsequent layers of the plurality of layers receiving the output of previous layers, weights of the layers being determined through training the first image model, pre-training a second sensor model using the second sensor data set and the weights of the layers that were determined through training the first image model, the pre-training the second sensor model comprising: dividing output of a convolution of predetermined dimensions of the second data set and the second number of second channels to generate different divided outputs to provide to a second plurality of branches, for each of the second plurality of branches: selecting a third number of the second number of channels, the third number of the second channels being equal to the first number of first channels, applying each layer of the plurality of layers using the weights of the layers that were determined through training the first model to the particular divided output of that particular branch, determining a particular weight for the particular branch to apply to the output of a last layer of the plurality of layers to generate a first particular branch output, fine-tune training the second sensor model using the second sensor data set using the particular weights of the particular branches and defining weights for the plurality of layers, the fine-tune training of the second sensor model comprising: dividing output of the convolution of predetermined dimensions of the second data set and the second number of second channels to generate different divided outputs to provide to the second plurality of branches, for each of the second plurality of branches: applying a first layer of the plurality of layers to the particular divided output of that particular branch, concatenating output of each particular branch and applying a second layer of the plurality of layers to at least a portion of the concatenated output, determining a particular weight for each layer of each branch based on the training of the second model, determining a particular weight for the particular branch to apply to the output of a last layer of the plurality of layers to generate a second particular branch output, and generating the second model for similar sensors of the second data set, the second model including weights determined in the fine-tune training.

In some embodiments, the first number of first channels is three. The second data set may be LiDAR data. In one example, the first data set is captured from a camera of the first environment and the LiDAR data is captured of the first environment.

In some embodiments the pre-training the second sensor model further comprises applying an activation function to the output of the convolution of predetermined dimensions of the second data set and applying normalization to an output of the activation function and applying a divided output of the normalization to the second plurality of branches. Fine-tuning training of the second sensor model may further comprise applying the activation function to the output of the convolution of predetermined dimensions of the second data set and applying normalization to the output of the activation function and applying the divided output of the normalization to the second plurality of branches.

Applying the first layer of the plurality of layers to the particular divided output of that particular branch may comprise extending the first layer with zeros to accommodate a greater number of second channels, the greater number of second channels being greater than the third number of second channels.

Fine-tuning of the second sensor model may comprise applying layers specific to target training task to the second particular branch output for further training. In some embodiments, the target training task is classification.

An example computer-readable medium may be readable by at least one processor comprises instructions to configure the at least one processor to perform a method. The method may comprise receiving a first image data set and a second sensor data set, the first image data set being based on images of a first environment, the second data set being measurements taken by sensors of the first environment, the first image data set having a first number of first channels, the second sensor data set having a second number of second channels, the second number of second channels being greater than the first number of first channels, training a first image model using the first image data set, the first image model including a plurality of layers, a first layer of the plurality of layers receiving predetermined dimensions and the first number of first channels of the first image data set, subsequent layers of the plurality of layers receiving the output of previous layers, weights of the layers being determined through training the first image model, pre-training a second sensor model using the second sensor data set and the weights of the layers that were determined through training the first image model, the pre-training the second sensor model comprising: dividing output of a convolution of predetermined dimensions of the second data set and the second number of second channels to generate different divided outputs to provide to a second plurality of branches, for each of the second plurality of branches: selecting a third number of the second number of channels, the third number of the second channels being equal to the first number of first channels, applying each layer of the plurality of layers using the weights of the layers that were determined through training the first model to the particular divided output of that particular branch, determining a particular weight for the particular branch to apply to the output of a last layer of the plurality of layers to generate a first particular branch output, fine-tune training the second sensor model using the second sensor data set using the particular weights of the particular branches and defining weights for the plurality of layers, the fine-tune training of the second sensor model comprising: dividing output of the convolution of predetermined dimensions of the second data set and the second number of second channels to generate different divided outputs to provide to the second plurality of branches, for each of the second plurality of branches: applying a first layer of the plurality of layers to the particular divided output of that particular branch, concatenating output of each particular branch and applying a second layer of the plurality of layers to at least a portion of the concatenated output, determining a particular weight for each layer of each branch based on the training of the second model, determining a particular weight for the particular branch to apply to the output of a last layer of the plurality of layers to generate a second particular branch output, and generating the second model for similar sensors of the second data set, the second model including weights determined in the fine-tune training.

BRIEF DESCRIPTION OF THE DRAWINGS

In the drawings, wherein like reference characters denote corresponding or similar elements throughout the various figures.

DETAILED DESCRIPTION

When two problem domains are similar, it may be desirable to transfer knowledge from an artificial neural network in one domain to a different domain. Various embodiments described herein may be useful when the two domains have the same number of physical dimensions but a different number of non-spatial attributes (e.g., a different number of channels).

The techniques depicted herein where weights from one trained model may be used as beginning weights for training a second model for a different number of channels. This solves a particular problem caused by technology. Namely, in the prior art, different models for different sensors (and data sets of that include a number of channels) are trained separately (i.e., not using information from between different models of different sensor types).

By utilizing learning (e.g., weights) from one trained model (for a first data set with a first set of channels) into another model's training (for a second data set with a greater number of channels than the first set), training efficiency and speed are increased (thereby improving scaling of model training). Further, in some embodiments, learning from the first model may be applied to training the second model which may improve insights and accuracy.

For example, when a 3D point cloud is projected onto a 2D image, it may be desirable to use existing image recognition neural networks on the projected image. Those existing image recognition neural networks may take 2D images as inputs, where the 2D images have X and Y dimensions as well as RGB channels to represent the color.

If the 3D point cloud is created from a LIDAR scanner, then the resulting 3D point cloud also has X and Y dimensions, but the RGB channels often are not present. Instead, there may be channels for intensity, local normal, local angle, depth, and return number. In this example, there is a greater number of channels for the LiDAR data than there is for 2D images (i.e., the LiDAR data has more than three channels).

Some embodiments described herein allows for transferring knowledge from an artificial neural network trained on an image with RGB inputs (3 channels), to a domain with the same spatial dimensions (X and Y) but an arbitrary number of channels which does not necessarily contain RGB. The number of channels will be denoted by C in the following description. This example will be used herein, but it should be understood that the techniques are not limited to this specific example.

Figure 1:
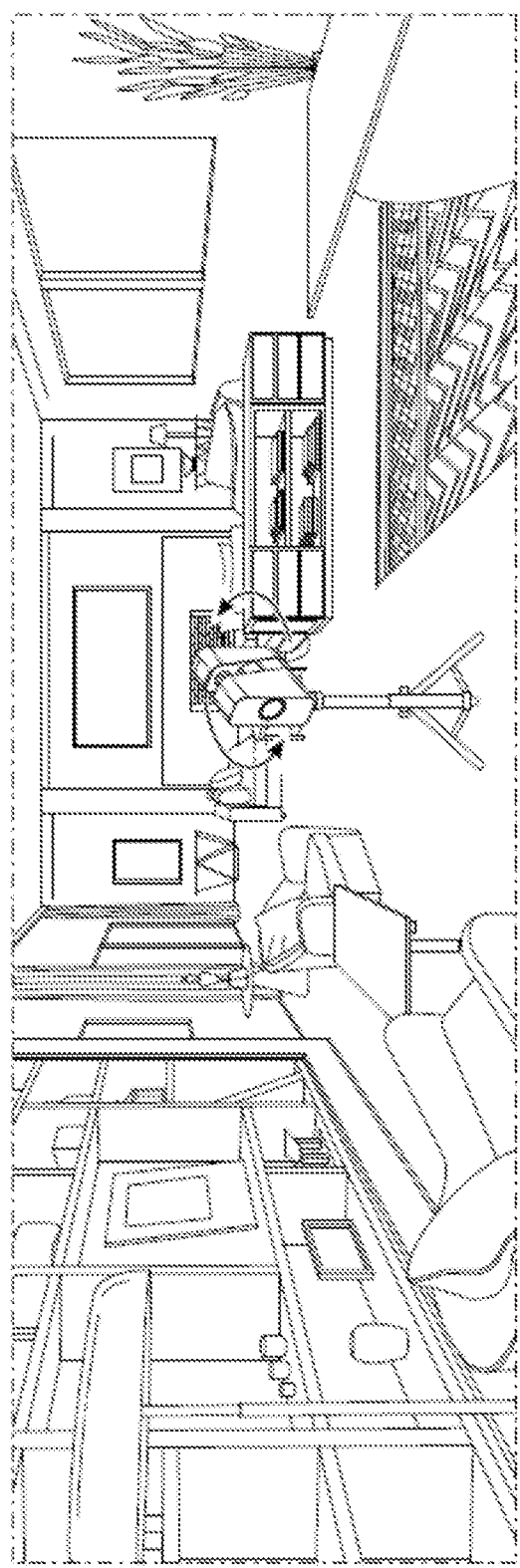
FIG. 1 depicts a simulation of a camera and LiDAR configured to collect measurements of a surrounding simulated environment in some embodiments.

FIG. 1 depicts a simulation of a camera and LiDAR configured to collect measurements of a surrounding simulated environment in some embodiments. Sensor data may be collected from different sensors collecting different information regarding the same environment. In various embodiments, a digital device, such as a training system 200 discussed with regard to FIG. 2, may utilize learning (e.g., weights) from training one model for one set of data with a set of channels to assist in training a different model with a different set of data but with a greater number of channels.

In this example, the camera and LiDAR may collect images as well as LiDAR information about the same environment. The information gained in training a model of images (e.g., for object detection or classification) may be utilized in training the model for the LiDAR data (e.g., also for object detection or classification). Although image and LiDAR data is discussed as examples, it will be appreciated that any two data sets with different data may be utilized.

Figure 2:
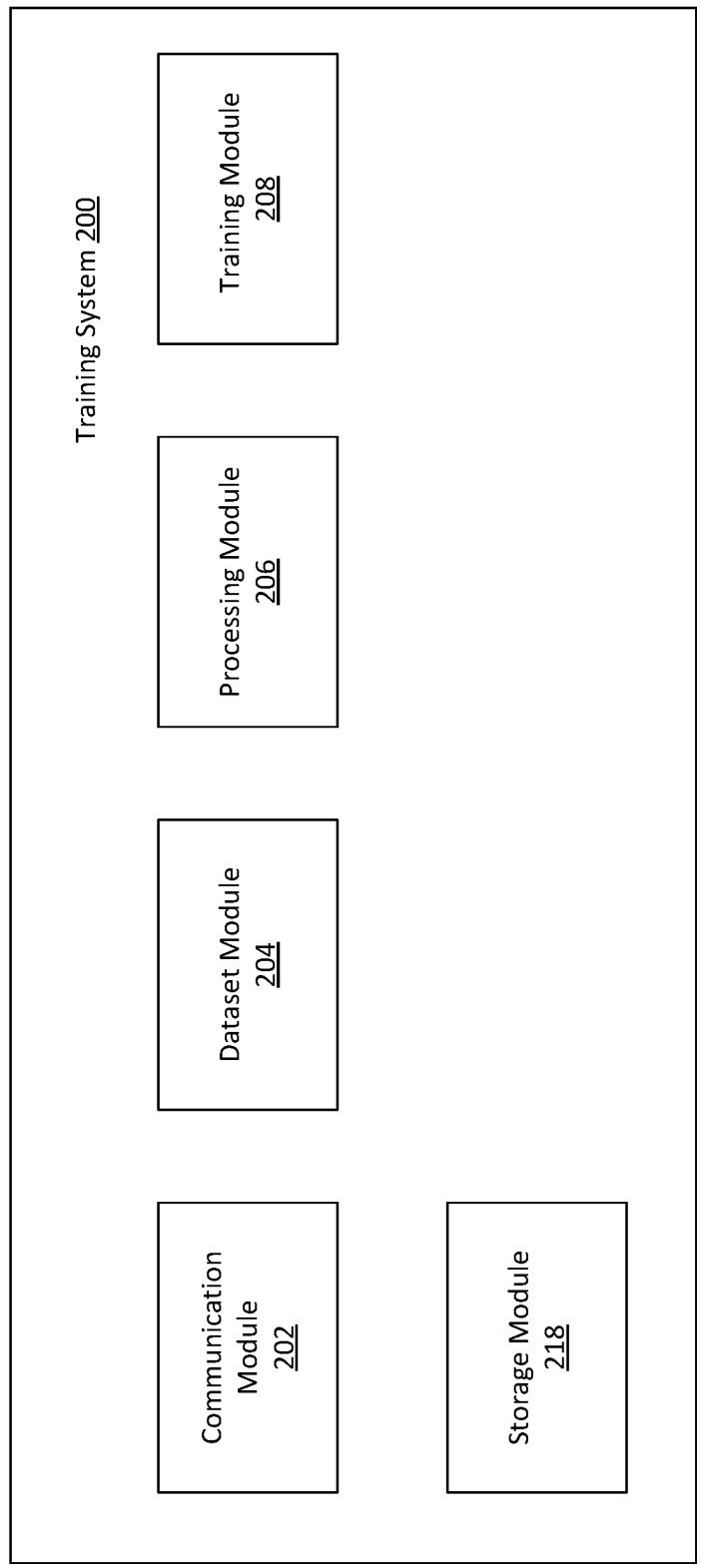
FIG. 2 is a training system in some embodiments.

FIG. 2 is a training system 200 in some embodiments. The training system 200 may include one or more digital devices. A digital device may be any hardware device with memory and a hardware processor. The training system 200 may receive images and/or other types of sensor data from any number of storage devices (e.g., stored across a network or locally) and/or from devices (e.g., camera and/or LiDAR devices) across one or more networks.

In this example, the training system 200 comprises a communication module 202, a dataset module 204, a processing module 206, a training module 208, a weighting module 210, an optional classification module 212, and/or a storage module 214.

The training system 200 may train a first data set and transfer the learning (e.g., weights) for training a second data set. The first data set may be from a first type of sensor with a first set of channels. The second data set may be from a second type of sensor (different than the first type of sensor) with a second set of channels, The second set of channels may be greater than the first set of channels. In some embodiments, the training system 200 may utilize the learning of a first model trained by another device or system to assist in training the second model.

In the example that follows, the first data set relates to images (or image data) and the second set of data relates to data taken by different sensors (e.g., not image data taken by a camera) of the same objects and/or environment.

The communications module 202 may receive images and/or other sensor data. For example, the communications module 202 may receive images of an environment (e.g., a room, scene, or the like) captured by one or more cameras. The images may be received from the cameras themselves, a digital device, storage device, or the like. The communications module 202 may also receive sensor data captured by other sensors of the same environment. In this example, the sensor data may include LiDAR data. Other examples include IR data or any other signal data (e.g., that may represent positioning and/or depth of data and/or objects).

In some embodiments, the communications module 202 may receive two data sets. The first data set may be from a first type of sensor (e.g., camera) and the second data set may be from a second type of data (e.g., LiDAR). The second set of data may have more channels than the first set of data. Both sets of data are of the same environment (e.g., captured by the different sensors being applied in the same environment).

The dataset module 204 may receive the first and second data sets. The dataset module 204 may scan and/or preprocess the data to identify the information within the channels (e.g., using metadata or reviewing the data from the datasets directly).

The processing module 206 may break down or identify information from both data sets. In various embodiments, the processing module 204 prepares the data to be sent for training by identifying dimensions of the data set, applying activation, and/or normalization. In some embodiments the processing module 206 may further organize the division and concatenation of information discussed with regard to FIG. 5A-C.

The training module 208 may train a first model (e.g., see model depicted in FIG. 3) and/or a second model (e.g., see models depicted in FIGS. 4A-C and 5A-C) using information (e.g., learning) from the first model. In various embodiments, the training module 208 may train the first image model and identify weightings for different layers. These weightings may be used as initial weights in training the second model. The training module 208 may further select, organize, and connect data between branches and/or layers as discussed regarding FIG. 5.

The storage module 210 may store weights and previously trained models. It will be appreciated that weights determined from one model may be utilized by any number of other models (e.g., other models being trained using different sensor types and more channels than the data used to train the first model) at any time.

The models being trained may be used for any number of purposes. In some embodiments, the models are trained for classification, object detection or the like. In one example, the first model is trained for classification of objects from the image information obtained from one or more cameras. The image information may be of a particular environment. The second model may be trained for classification of objects from the LiDAR data information obtained from one or more LiDAR devices. In this example, the LiDAR data information is also of the same particular environment. By using the learning (e.g., weights) of the first model for the image data in training (particularly in pre-training) of the second model for LiDAR data information, improvements in speed may be obtained over training the second model without learning from the first model. Further, in some embodiments, there may be improvements in accuracy of the trained second model by leveraging the learning from the first model.

In one example, a general architecture may be a skipnet-mobilenet architecture. Feature extraction of images and/or LiDAR data (e.g., or other data) may be performed, in one example, using a mobilenet (e.g., MobileNetV2). Decoding, in this example, may be performed using SkipNet. This architecture and the trained models may be utilized, for example, for semantic segmentation.

Regarding the mobilenet implementation for feature extraction, the model (e.g., the model trained as discussed regarding FIGS. 3-5) may be trained (e.g., using imagenet data) and layers downsampled x2, x4, x8, x16, and x32. It will be appreciated that any downsampling and any images may be used for training and verification.

Regarding skipnet decoding, the skipnet portion may skip convolutions dependings on the input image. In one example, the skipnet decoder reverses the downsampling from the encoder (e.g., x32, x16, x8, x4, and x2). In this example, no pretrained weights may be used.

The optimizer for example may be Adam with an initial earning rate of 0.001, decay steps 500, decay rate 0.9, and staircase.

It will be appreciated that the downsampling and configurations for the optimizer (and type of optimizer) are for examples only and does not limit the discussion. The transfer learning approach discussed herein may be utilized with any architecture (e.g., not just skipnet-mobilnet) and any configurations or training data.

It will be appreciated that any architecture may be used (e.g., not limited to the skipnet-mobilenet architecture described).

Figure 3:
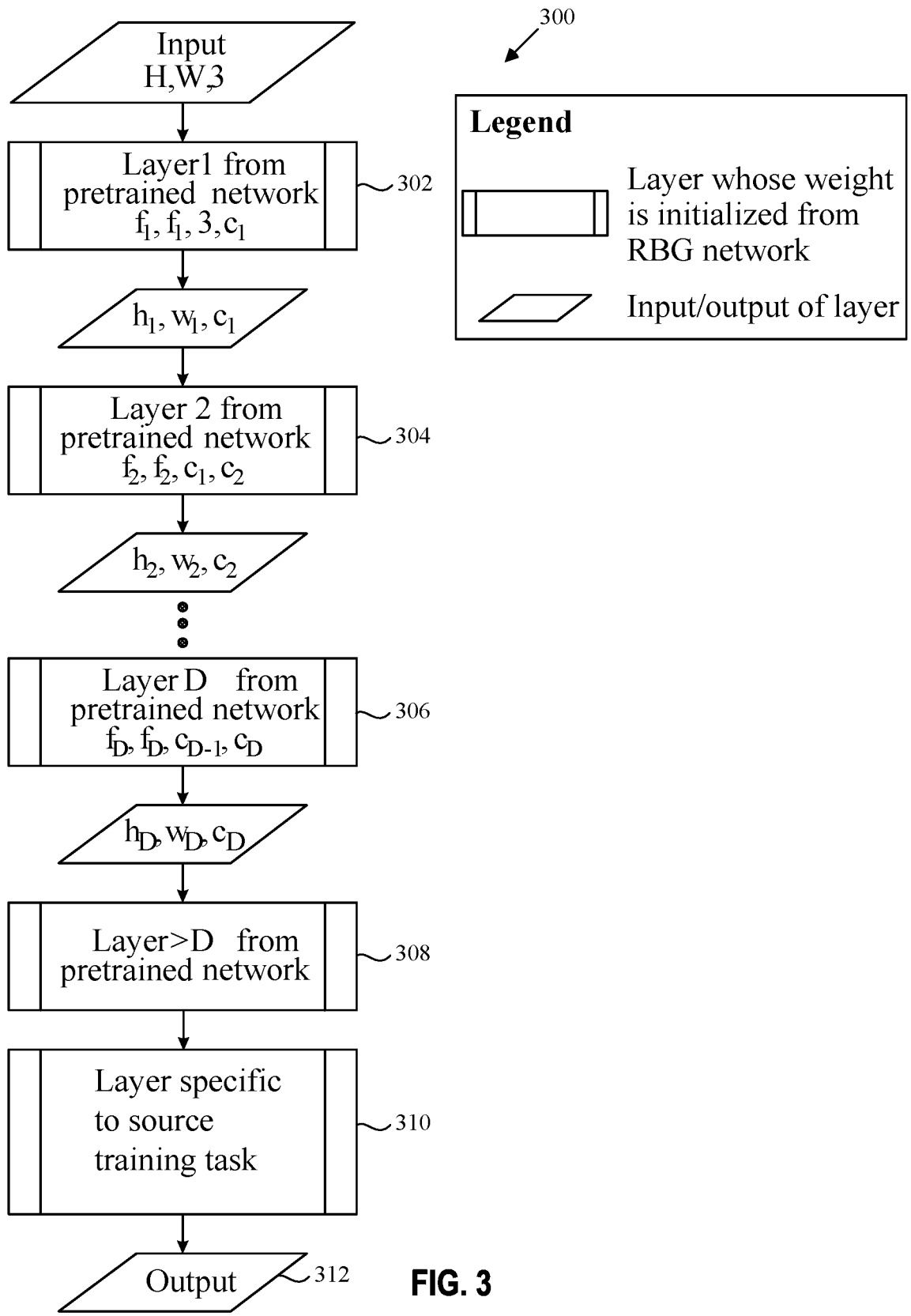
FIG. 3 depicts model training 300 of images of an environment in some embodiments.

FIG. 3 depicts model training 300 of images of an environment in some embodiments. The inputs/outputs of the layers of the network depicted in FIG. 3 include spatial dimensions h×w with c channels. For example, the RGB input (e.g., received by the communication module 202 and optionally processed by the processing module 206) has X and Y dimensions of H×W with 3 channels (RGB). Each layer is characterized by four quantities. The first two quantities refer to the dimensions of the convolution filter used in that layer, and the last two quantities are the number of input channels and output channels, respectively. In the example of FIG. 1, layer 1 (302) uses convolution filters with dimensions $f_1 \times f_1$, 3 input channels, and $c_1$ output channels. The output of layer 1 (302) has X and Y dimensions of $h_1 \times w_1$ with $c_1$ channels, and so on.

The N layers of the source network are split into the first D layers and layers D+1 to N, as described herein. The training module 208 may determine weights of particular layers during training and re-training of the model.

As follows in FIG. 3, the output of layer 1 (302) is fed into layer 2 (304) which uses convolution filters with dimensions $f_2 \times f_2$, 3 input channels, and $c_2$ output channels. The output of layer 2 (304) has X and Y dimensions of $h_2 \times w_2$ with $c_2$ channels. Each D layer (306) (starting with D=3 and subsequent layers being D=D+1), uses convolution filters with dimensions $f_D \times f_D$, 3 input channels, and $c_D$ output channels. The output of each layer D (306) has X and Y dimensions of $h_D \times w_D$ with $c_D$ channels.

The output of the layers is greater than D for the pretrained network 308 and may process the data similarly as the other layers. The output of those previous layers are provided to one or more layer(s) that are specific to the source training task 310 (e.g., for semantic segmentation and/or classification) and is then output in 312.

Figure 4A:
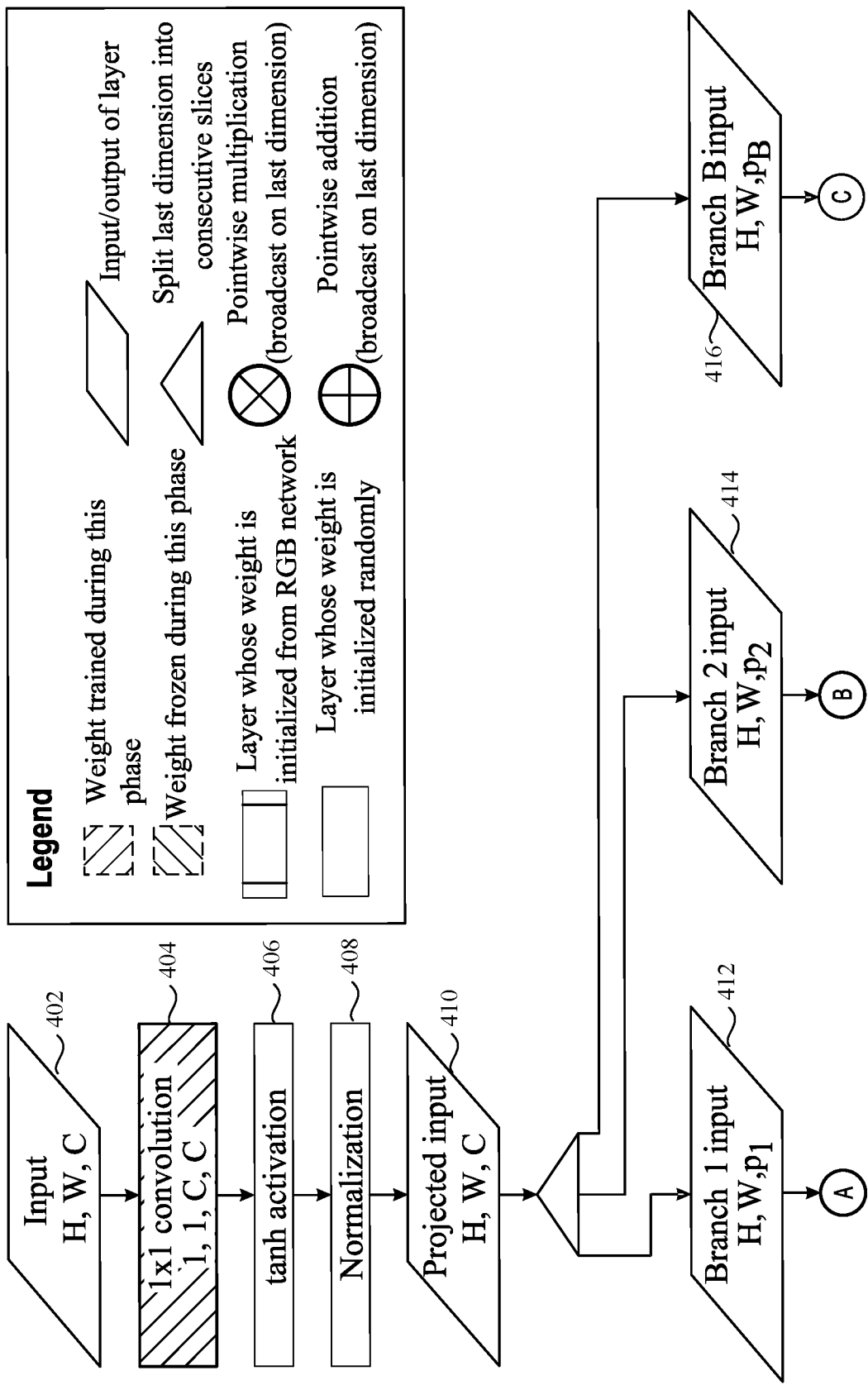
FIGS. 4A-C depict an example method for pre-training the second data set (e.g., LiDAR data) of the same environment of FIG. 3 using the layers and weights from the first training method depicted in FIG. 3.
Figure 4B:
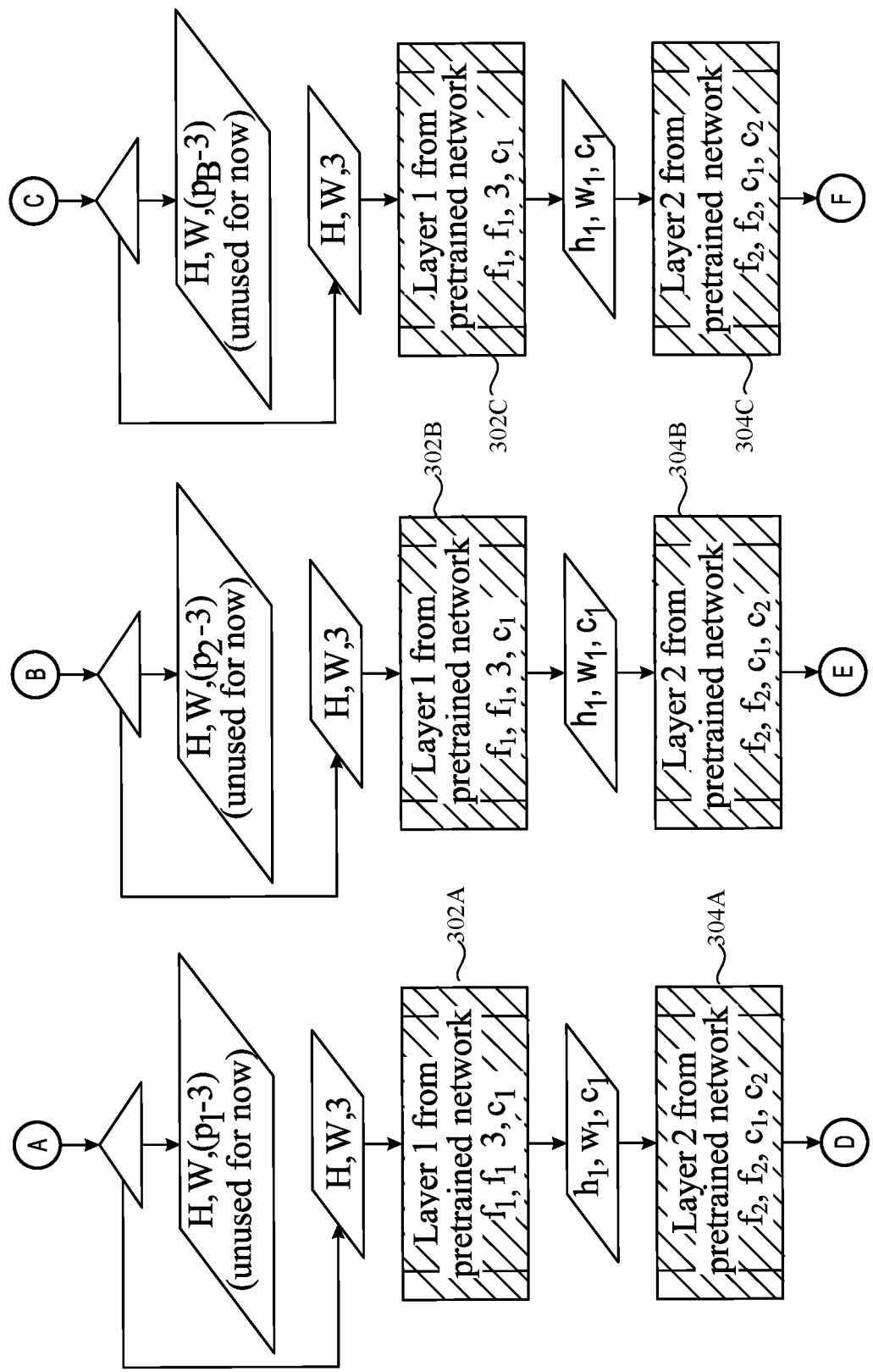
Figure 4C:
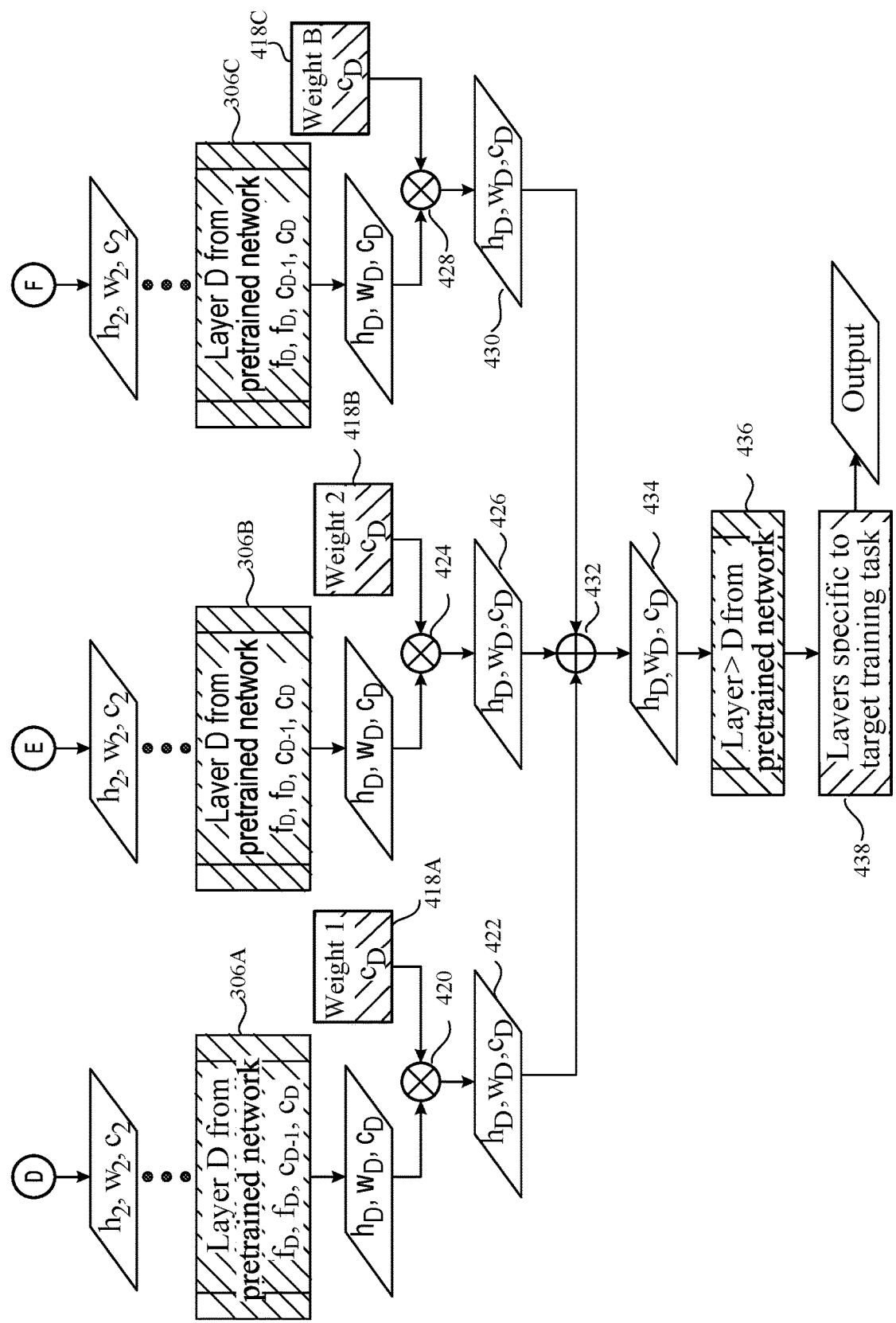
Figure 5A:
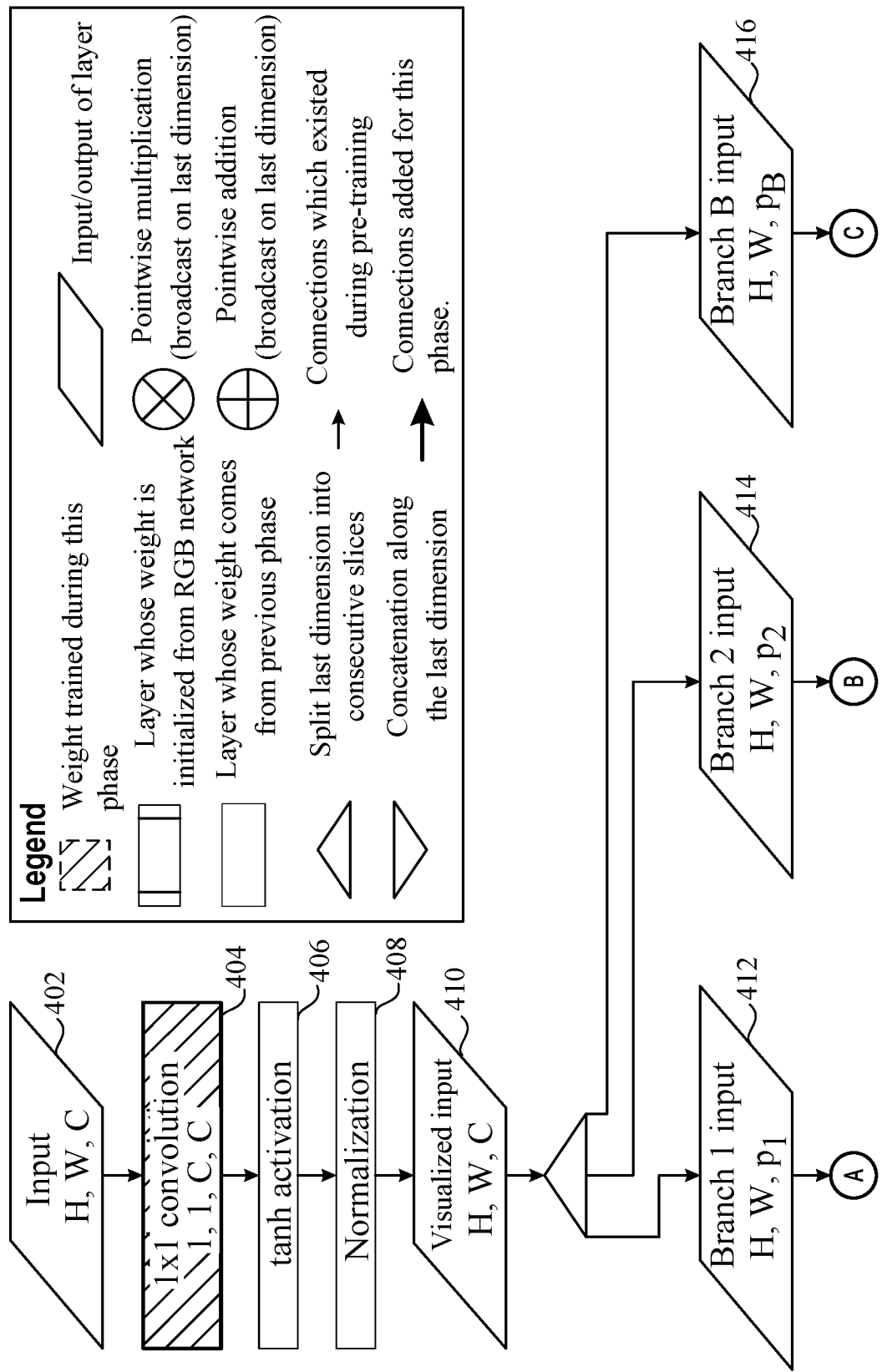
FIGS. 5A-C depicts a fine-tuning phase of the model for the second data set in some embodiments.
Figure 5B:
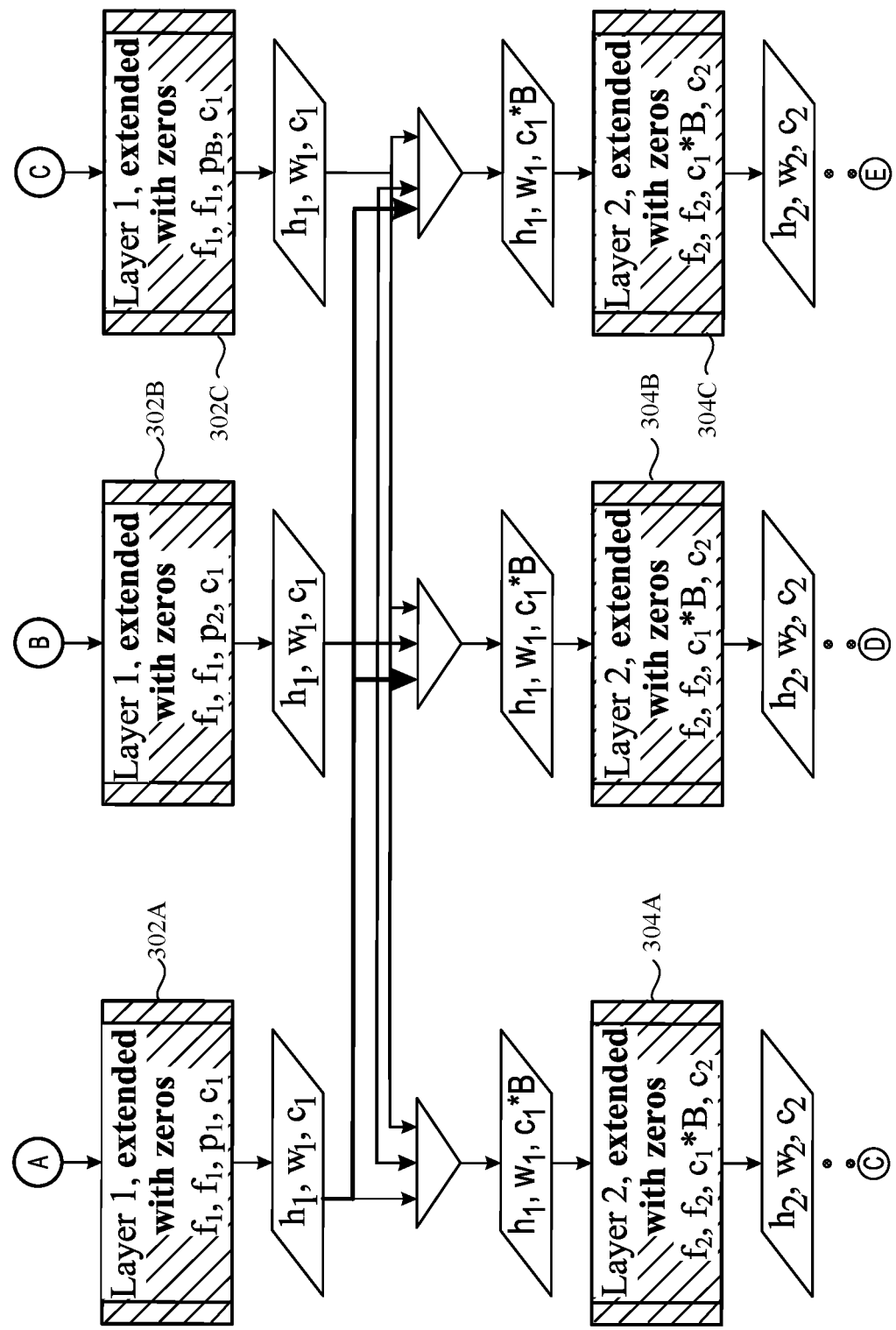
Figure 5C:
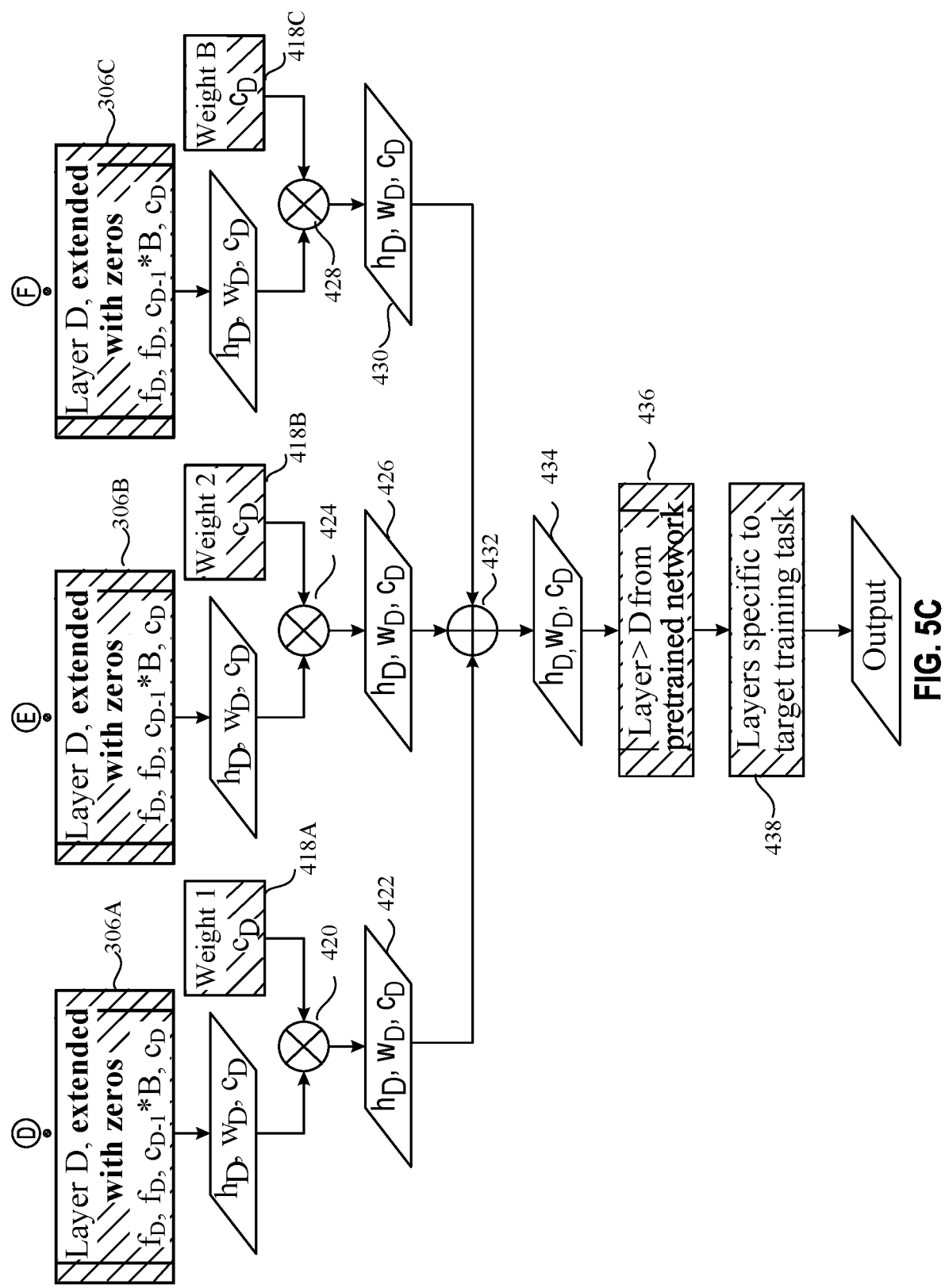

FIGS. 4A-C depict an example method for pre-training the second data set (e.g., LiDAR data) of the same environment of FIG. 3 using the layers and weights from the first training method depicted in FIG. 3. FIGS. 4A-C depict pretraining of the model for the second data set. In this method, weights for layers are used from the trained model for the second data set. Weights may be determined for the 1×1 convolution and the weights that are mixed with the outputs from the layers of the pretrained data. In some embodiments, FIGS. 4A-C depict a pretraining process that begins training (and weight determination) using the weights and layers that were previously trained for the other data set (e.g., the method depicted in FIG. 3). FIGS. 5A-C depict an example method where weights are continued to be trained (e.g., including the weights of the previously fixed-weight layers) using concatenated data from different branches.

In the example method depicted in FIGS. 4A-C, the input data from the second data set (e.g., the LiDAR data) is preprocessed in a preprocessing phase 402 to match the input of the source network. In the preprocessing phase 402, the new data has the same number of physical dimensions as that applied used in FIG. 3, but has a different number of non-spatial attributes (e.g., a different number of channels).

In this example, the training module 208 may apply a 1×1 convolution with C input and output channels to the input H, W, C (e.g., the LiDAR data). The training module 208 may apply an activation function to the output of the 1×1 convolution 406. The training module 208 may normalize the output of the activation function 408 to the range expected by the pretrained RGB network depicted in FIG. 1. The activation function 408 may determine the output of the neural network and maps the resulting values (e.g., between −1 to 1). While FIG. 4A depicts the activation function 408 as a hyperbolic tangent activation function, it will be appreciated that any activation function may be used (e.g., logistic sigmoid, rectified linear unit (ReLU), or the like).

The output of the normalization is the projected input 410 with H, W, C for which is divided into B branches (e.g., branch 412, 414, and 416) of at least 3 channels each. In this case, it will be appreciated that the number of channels for each branch may be the same as the expected number of channels by the previous pretrained network (e.g., the pretrained RGB method depicted in FIG. 3).

In FIG. 4A, the number of channels $p_B \geq 3$. Each branch can be understood as an RGB visualization of the input. In some embodiments, there may be additional channels with limited usefulness for the target task.

In the example of FIG. 4A, the output from the projected input 410 is divided into a number of branches (e.g., to branch 1 (412), to branch 2 (414), and to branch B(416)).

There may be any number of branches (i.e., branches from 1 to B). Returning to the example of FIG. 4A, branch 1 input has $p_1$ inputs, branch 2 input has $p_2$ inputs, and branch B input has $p_B$ inputs.

For each branch, three channels are applied to the next layers. Each branch utilizes three or more input channels. In some embodiments, each branch utilizes the same input channels as the other branches. In various embodiments, each branch utilizes the same or different channels in any order. For example, branch 1 could utilize channels for z (height), intensity, curvature, and zenith angle while branch 2 could utilize channels for intensity, curvature, zenith angle, and return number. In some embodiments, the channels may be in any order at any branch. The notation for the number of channels each branch takes in is $P_b$, where b is the branch number. Using the same example: p1=4 and p2=4 for branches 1 and 2, respectively. In some embodiments, each branch, during the pre-training phase, effectively uses the first three channels during the pre-training. Using the same example: branch 1 would only effectively use z (height), intensity, and curvature while branch 2 would use intensity, curvature, and zenith angle.

It will be appreciated that the pretrained layers (e.g., the pretrained layers depicted in FIG. 3) expect a particular number of channels (e.g., based on the previous training). As such, a number of channels expected by the pretrained layers are provided from the branch inputs (e.g., branch 1 input) while the remaining channels (assuming there are more channels than three in the current data set) are unused for now (each until fine-training discussed with regard to FIGS. 5A-C).

For each branch, there is a copy of the D first layers of the pretrained RGB network (e.g., a copy of the D first layers of the network depicted in FIG. 3) with the weights from the pretrained network. In FIG. 4B which receives the outputs A, B, and C depicted in FIG. A, the training module 208 applies the segment of data of the branch to layer 1 (302A) using the weights trained in the method of FIG. 3. Similarly, the training module 208 applies the segment of data of the $2^{nd}$ branch to layer 1 (302B) using the weights trained in the method of FIG. 3 and applies the segment of the $3^{rd}$ branch to layer 1 (302C) using the weights trained in the method of FIG. 3. As discussed, there may be any number of branches. Layer 1 (i.e., layer 1 302A-C) for each branch may including weightings and/or configurations learned from the method of FIG. 3.

In this example, the 3 channels of each branch input is fed to its respective copy of the first layer of the pretrained RGB network. It will be appreciated that the three channels that are provided to subsequent layers of the pretrained RGB network may be selected in any number of ways. For example, the channels to be inputted at this time to the next pretrained layers may be selected by a user (e.g., a data scientist, engineer, or software user), random, the "first" three channels (e.g., the order dictated by the data set), and/or any other method.

In the pre-training phase of FIG. 4B, each layer is parameterized as follows: $f_d, f_d, c_{d-1}, c_d$ where d is a layer number, f is the convolution dimensions, and c is the number of channels.

In an example, a first branch after division of the data from the projected input 410 into branch 1, $H_1, W_1, 3$ are input to layer 1 (302A) from the pretrained network. The weights of layer 1 (302A) are maintained from initial training (e.g., when previously trained). As discussed herein, layer 1 (302A) uses convolution filters with dimensions f1×f1, 3 input channels, and c1 output channels. Three input channels are utilized as being the number of channels for the network in FIG. 3 (i.e., three input channels for the RGB trained network).

The following layers have input channels equivalent to the number of output channels from the previous layer. For example, layer 2 (304A) has $f_2$, $f_2$, $c_1$, $c_2$ and in FIG. 4C, the last layer (layer D 306A) is $f_d$, $f_d$, $c_{d-1}$, $c_d$.

The output of layer 1 302A (with X and Y dimensions of $h_1 \times w_1$ with $c_1$ channels) is then input into layer 2 (304A). Like layer 1, the weights of layer 2 (304A) are maintained from initial training (e.g., when previously trained). As discussed herein, layer 2 (304A) uses convolution filters with dimensions $f_2 \times f_2$, 3 input channels, and $c_2$ output channels.

The output of layer 2 (304A) (with X and Y dimensions of $h_2 \times w_2$ with $c_2$ channels) is provided to a subsequent pretrained layer and so forth. In the example of FIG. 4A-C, there may be any number of layers between layer 2 (304A) and layer D (306A). Each layer in FIGS. 4B-C may maintain the weights from the initial training and use convolution filters as shown in the figures and discussed herein.

The weights of layer D (306A) may be maintained from initial training (e.g., when previously trained). As discussed herein, layer D (306A) uses convolution filters with dimensions $f_D \times f_D$, 3 input channels, and $c_D$ output channels. The output of layer D (306A) in this example is $h_D \times w_D$ with $c_D$ channels.

The weight 1 $c_D$ 418A (which is trained during this phase and not the pretrained phase of FIG. 3) is multiplied (e.g., with multiplier 420) to the output of layer D (306A) $h_D \times w_D$ with $c_D$ channels to generate weighted $h_D \times w_D$ with $c_D$ 422.

In an example of a second branch after division of the data from the projected input 410 into branch 2 (414), $H_2$, $W_2$, 3 are input into layer 1 (302B) from the pretrained network. The weights of layer 1 (302B) are maintained from initial training (e.g., when previously trained). As discussed herein, layer 1 (302B) uses convolution filters with dimensions $f_1 \times f_1$, 3 input channels, and $c_1$ output channels.

The output of layer 1 (302B) (with X and Y dimensions of $h_1 \times w_1$ with $c_1$ channels) is then input into layer 2 (304B). Like layer 1 (302B), the weights of layer 2 (304B) are maintained from initial training (e.g., when previously trained). As discussed herein, layer 2 (304B) uses convolution filters with dimensions $f_2 \times f_2$, 3 input channels, and $c_2$ output channels.

The output of layer 2 (304B) (with X and Y dimensions of $h_2 \times w_2$ with $c_2$ channels) is provided to a subsequent pretrained layer and so forth. As discussed herein, there may be any number of layers between layer 2 (304B) and layer D (306B). Each layer will maintain the weights from the initial training and use convolution filters as shown in the figures and discussed herein.

The weights of layer D (306B) are maintained from initial training (e.g., when previously trained). As discussed herein, layer D (306B) uses convolution filters with dimensions $f_D \times f_D$, 3 input channels, and $c_D$ output channels. The output of layer D (306B) in this example is $h_D \times w_D$ with $c_D$ channels.

The weight 2 $c_D$ 418B (which is trained during this phase and not the pretrained phase) is multiplied by multiplier 426 to the output of layer D (306B) $h_D \times w_D$ with $c_D$ channels to generate weighted $h_D \times w_D$ with $c_D$ 426.

In FIG. 4A, a third branch (i.e., branch (B) 416) is shown. It will be appreciated that there may be any number of branches. For example, the data from the projected input may be divided for any number of branches. Each branch may include any number of the pretrained layers (e.g., each branch including layers 1-D from the pretrained network and with weights from the pretrained network).

In an example of a third branch (B) after division of the data from the projected input 410 into branch 3 (416), $H_2$, $W_2$, 3 are input to layer 1 (302C) from the pretrained network. As discussed herein, the weights of layer 1 (302C) are maintained from initial training (e.g., when previously trained). As also discussed herein, layer 1 (302C) uses convolution filters with dimensions $f_1 \times f_1$, 3 input channels, and $c_1$ output channels.

The output of layer 1 (302C) (with X and Y dimensions of $h_1 \times w_1$ with $c_1$ channels) is then input into layer 2 (304C). Like layer 1 (302C), the weights of layer 2 (304C) are maintained from initial training (e.g., when previously trained). As discussed herein, layer 2 (304C) uses convolution filters with dimensions $f_2 \times f_2$, 3 input channels, and $c_2$ output channels.

The output of layer 2 (304C) (with X and Y dimensions of $h_2 \times w_2$ with $c_2$ channels) is provided to a subsequent pretrained layer and so forth. As discussed herein, there may be any number of layers between layer 2 (304C) and layer D (306C). Each layer will maintain the weights from the initial training and use convolution filters as shown in the figures and discussed herein.

The weights of layer D (306C) are maintained from initial training. As discussed herein, layer D (306C) uses convolution filters with dimensions $f_D \times f_D$, 3 input channels, and $c_D$ output channels. The output of layer D (306C) in this example is $h_D \times w_D$ with $c_D$ channels.

The weight B $c_D$ 418C (which is trained during this phase and not the pretrained phase) is multiplied by multiplier 428 to the output of layer D (306C) $h_D \times w_D$ with $c_D$ channels to generate weighted $h_D \times w_D$ with $c_D$ 430.

The outputs of each branch (e.g., outputs 422, 426, and 430) are added 432 to produce output 434 ($h_d$, $w_d$, $c_d$) and fed into the rest of the pre-trained network 436. The layers of the pre-trained network 436 may have the weights trained from the previous training. The output is then input into layers specific to target training task 438. In one example, the layers specific to the target training task 438 may be classifications for the new data. For example, LiDAR data may be processed by the layers trained for RGB data. The layers specific to the target training task 438 may be classifications for information found in the LiDAR data after processing through the branches as discussed.

There is a trade-off for the choice of D. A lower value risks to introduce an information bottleneck at the output of layer D (e.g., if C>>3). Further, the layers before D may benefit more from the initialization from the RGB network. A higher value increases the number of parameters and operations (e.g., slower inference and training, higher risk of overfitting). It also means less layers depending on the whole input, which may be detrimental if the information necessary for the task cannot be projected on independent signals of 3 channels.

In the pre-training phase 402 depicted in FIG. 4, the pre-trained weights (the B branches and the layers following the weighted sum of the branches) may be fixed. The weights that are trained are the projections (the 1×1 convolution), the weight for the branches sum (weight 1-B), and the final layers (whichever layers would normally be trained from scratch when transferring knowledge from this network to another RGB network). This can be interpreted as finding B meaningful different visualizations of the data, while avoiding catastrophic forgetting.

FIGS. 5A-C depicts a fine-tuning phase of the model for the second data set in some embodiments. In FIGS. 5A-C trains the weights using a similar structure as that depicted in FIGS. 4A-4C but applies additional connections and retrains weights of layers. The process depicted in FIGS. 5A-C generate further weights for classification to complete (or assist in completing) training. Similar to FIGS. 4A-C, the number of channels $p_B \geq 3$. Each branch can be understood as an RGB visualization of the input. In some embodiments, there may be additional channels with limited usefulness for the target task.

In the training architecture (also depicted in FIGS. 4A-C), the output from the projected input is divided into a number of branches (branch 1 input 412, branch 2, input 414, to branch B, input 416). As discussed, there may be any number of branches (i.e., branches from 1 to B).

During the fine-tuning phase, the first layer now takes in and uses all channels. Before training happens, the weights for the first 3 channels may remain the same as the weights from the pre-trained network. The remaining weights for the other channels may be initialized to 0. The direct output of each layer may be the same shape as in the pre-training phase (e.g., the direct output of layer 1 is still h1, w1, c1).

The direct outputs of the branches 412, 414, and 416 in fine tuning (as depicted in FIG. 5B) may be concatenated together and used as the input to the next layer of every branch. In some embodiments, the direct output of the branches may be concatenated and used as the input to the next layer of a subset of branches. In some embodiments, only some of the direct outputs of some of the branches may be concatenated together to be used in all or a subset of the next layer.

Now each layer (in each branch) takes in an input of shape $h_{d-1}$, $w_{d-1}$, $c_{d-1}*B$, where B is the number of branches. In other words, each layer may take in B times more channels than it had in the pre-training phase. In some embodiments, each branch (for a given layer) is getting the same input data after layer 1 (i.e., without further sharing of data between branches). Data may or may not be shared among branches after subsequent layers because each layer may be pre-trained and, as such, it may be unlikely to find the same minima despite getting the same inputs.

In some embodiments, in between each layer (or a subset of layers), the direct outputs of the previous layer may be concatenated together and used as the input to the next layer of every branch. In some embodiments, the direct output of the previous layers may be concatenated and used as the input to the next layer of a subset of branches. In some embodiments, only some of the direct outputs of some of the branches may be concatenated together to be used in all or a subset of the next layer.

In various embodiments, the outputs of the previous layer in between two or more intermediate layers may be concatenated together. For example, the output of all layers of a particular layer set (e.g., layer 1 across all branches) or a subset of a particular layer (e.g., layer 1 and layer 2 but not layer 3) may be concatenated together and used as the input to the next layer of every branch or a subset of branches.

For example, data from the output of layer 1 may be concatenated and fed into layer 2 but not between layers 2 and 3. Alternately, data from the output of layer 1 may be concatenated and fed into layer 2 as described herein and data from the output of layer 2 may be concatenated and input into layer 3.

For each branch, each layer 1 (302), layer 2 (304), and layer 3 (306) may be extended with zeros to accommodate additional or different channels (e.g., any number of channels). In some embodiments, each branch utilize the same input channels as the other branches. In various embodiments, each branch utilizes the same or different channels in any order. In some embodiments, the channels may be in any order at any branch. The notation for the number of channels each branch takes in is $P_b$, where b is the branch number. Using the same example: p1=4 and p2=4 for branches 1 and 2, respectively.

In an example of a first branch after division of the data from the projected input 410 into branch 1 (412), $H_1$, $W_1$, $P_1$ are input to layer 1 (302A). The weights of layer 1 (302A) are no longer fixed from the previous training. As discussed herein, layer 1 (302A) uses convolution filters with dimensions f1×f1, p1 input channels, and c1 output channels.

The following layers have input channels equivalent to the number of output channels from the previous layer. For example, layer 2 (304A): $f_2$, $f_2$, $c_1*B$, $c_2$. The last layer (306A) (layer D): $f_d$, $f_d$, $c_{d-1}*B$, $c_d$.

The output of layer 1 (302A) (with X and Y dimensions of $h_1 \times w_1$ with $c_1$ channels) is concatenated as discussed herein. The concatenated data may be input into layer 2 (304A). As discussed herein, layer 2 (104) uses convolution filters with dimensions $f_2 \times f_2$, $c_1*B$ input channels, and $c_2$ output channels.

The output of layer 2 (304B) (with X and Y dimensions of $h_2 \times w_2$ with $c_2$ channels) is provided to a subsequent pretrained layer and so forth (e.g., in some embodiments, the output between layers is further concatenated as discussed herein). In the example of FIG. 5B, there may be any number of layers between layer 2 (304) and layer D (306). Each layer will maintain the weights from the initial training and use convolution filters as shown in the figures and discussed herein.

For example, the weights of layer D (306A) are maintained from initial training (e.g., when previously trained). As discussed herein, layer D (306A) uses convolution filters with dimensions $f_D \times f_D$, $C_D-1*B$ input channels, and $c_D$ output channels. The output of layer D (306A) in this example is $h_D \times w_D$ with $c_D$ channels.

The weight 1 $c_D$ 418A (which is trained during this phase and not the pretrained phase) is multiplied by multiplier 420 to the output of layer D (306A) $h_D \times w_D$ with $c_D$ channels to generate weighted $h_D \times w_D$ with $c_D$.

In an example of a second branch after division of the data from the projected input 410 into branch 2 (414), $H_2$, $W_2$, 3 are input to layer 1 (302B) from the pretrained network.

The output of layer 1 (302B) (with X and Y dimensions of $h_1 \times w_1$ with $c_1$ channels) is then input into layer 2 (304B). The output of layer 2 (304B) (with X and Y dimensions of $h_2 \times w_2$ with $c_2$ channels) is provided to a subsequent pre-trained layer and so forth. As discussed herein, there may be any number of layers between layer 2 (104) and layer D (106).

As discussed herein, layer D (306B) uses convolution filters with dimensions $f_D \times f_D$, $C_1*B$ input channels, and $c_D$ output channels. The output of layer D (306B) in this example is $h_D \times w_D$ with $c_D$ channels.

The weight 2 $c_D$ 418B is multiplied by multiplier 420 to the output of layer D (306B) $h_D \times w_D$ with $c_D$ channels to generate weighted $h_D \times w_D$ with $c_D$.

In FIGS. 5A-C, a third branch (i.e., branch (B) 416) is shown. It will be appreciated that there may be any number of branches. For example, the data from the projected input may be divided for any number of branches.

In an example of a third branch (B) after division of the data from the projected input 410 into branch 3 (416), $H_2$, $W_2$, $P_B$ are input to layer 1 (302C). As discussed herein, layer 1 (302C) uses convolution filters with dimensions $f_1 \times f_1$, $P_B$ input channels, and $c_1$ output channels.

The output of layer 1 (302C) (with X and Y dimensions of $h_1 \times w_1$ with $c_1$ channels) is then input into layer 2 (304C). As discussed herein, layer 2 (304C) uses convolution filters with dimensions $f_2 \times f_2$, $c_1 * B$ input channels, and $c_2$ output channels.

The output of layer 2 (304C) (with X and Y dimensions of $h_2 \times w_2$ with $c_2$ channels) is provided to a subsequent pretrained layer and so forth. As discussed herein, there may be any number of layers between layer 2 (304C) and layer D (306C).

The output of layer D (306C) in this example is $h_D \times w_D$ with $c_D$ channels.

The weight B $c_D$ 418C (which is trained during this phase and not the pretrained phase) is multiplied by multiplier 428 to the output of layer D (306C) $h_D \times w_D$ with $c_D$ channels to generate weighted $h_D \times w_D$ with $c_D$ 430.

The outputs of each branch (e.g., outputs 422, 426, and 430) are added 432 to produce output 434 ($h_d$, $w_d$, $c_d$) and fed into the rest of the pre-trained network 436. The output is then input into layers specific to target training task 438. In one example, the layers specific to the target training task 438 may be classifications for the new data referred to herein. For example, LiDAR data may be processed by the layers trained for RGB data. The layers specific to the target training task 238 may be classifications for information found in the LiDAR data after processing through the branches as discussed.

Figure 6:
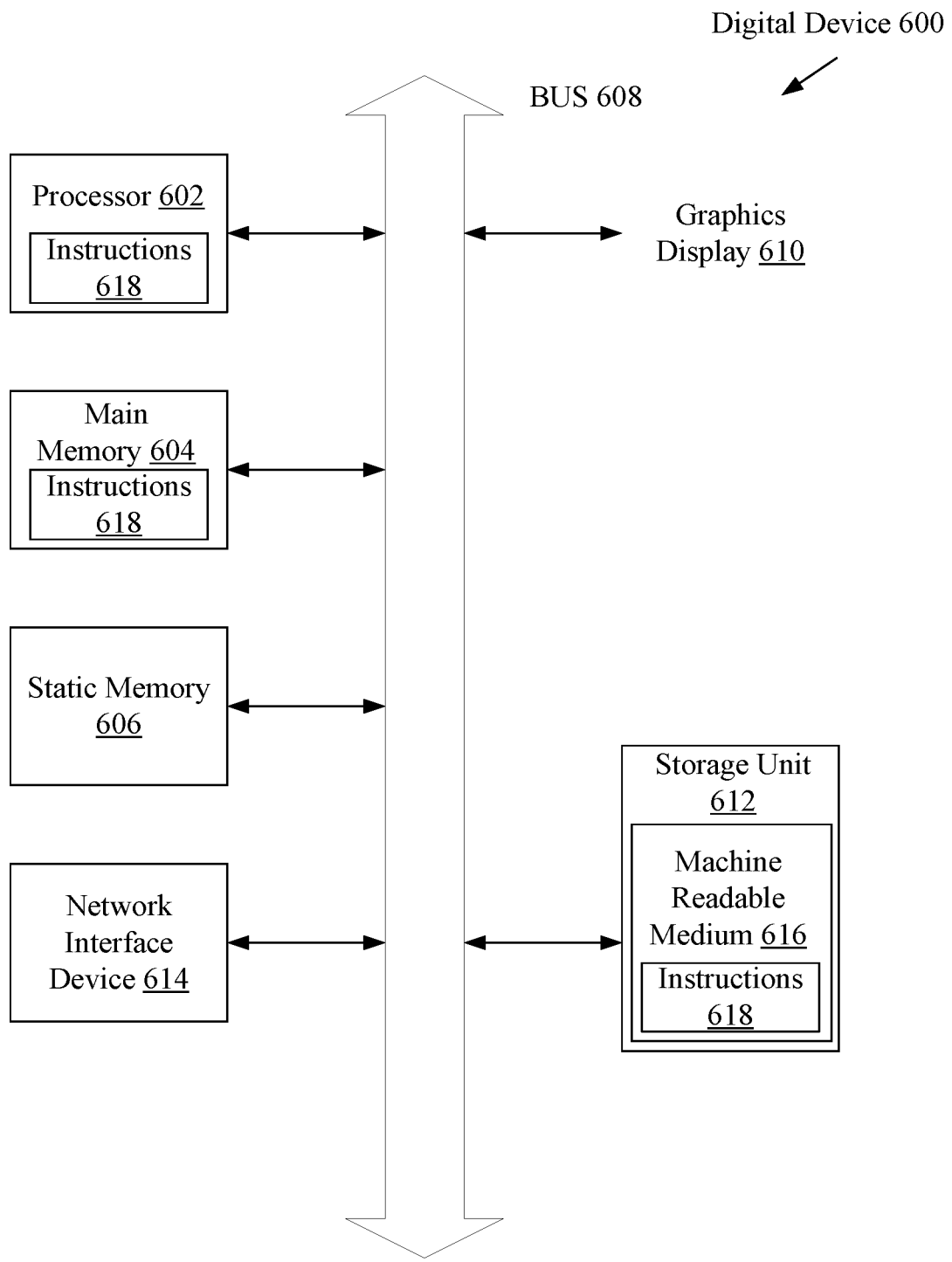
FIG. 6 depicts a block diagram of an example digital device according to some embodiments.

FIG. 6 depicts a block diagram of an example digital device 600 according to some embodiments. Digital device 600 is shown in the form of a general-purpose computing device. Digital device 600 includes processor 602, RAM 604, communication interface 606, input/output device 608, storage 610, and a system bus 612 that couples various system components including storage 610 to processor 602.

System bus 612 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Digital device 600 typically includes a variety of computer system readable media. Such media may be any available media that is accessible by the component failure prediction system 104 and it includes both volatile and nonvolatile media, removable and non-removable media.

In some embodiments, processor 602 is configured to execute executable instructions (e.g., programs). In some embodiments, the processor 602 comprises circuitry or any processor capable of processing the executable instructions.

In some embodiments, RAM 604 stores data. In various embodiments, working data is stored within RAM 604. The data within RAM 604 may be cleared or ultimately transferred to storage 610.

In some embodiments, communication interface 606 is coupled to a network via communication interface 606. Such communication can occur via Input/Output (I/O) device 608. Still yet, component failure prediction system 104 can communicate with one or more networks such as a local area network (LAN), a general wide area network (WAN), and/or a public network (e.g., the Internet).

In some embodiments, input/output device 608 is any device that inputs data (e.g., mouse, keyboard, stylus) or outputs data (e.g., speaker, display, virtual reality headset).

In some embodiments, storage 610 can include computer system readable media in the form of volatile memory, such as read only memory (ROM) and/or cache memory. Storage 610 may further include other removable/non-removable, volatile/non-volatile computer system storage media. By way of example only, storage 610 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CDROM, DVD-ROM or other optical media can be provided. In such instances, each can be connected to system bus 612 by one or more data media interfaces. As will be further depicted and described below, storage 610 may include at least one program product having a set (e.g., at least one) of program modules that are configured to carry out the functions of embodiments of the invention. In some embodiments, RAM 604 is found within storage 610.

Program/utility, having a set (at least one) of program modules, such as component failure prediction system 104, may be stored in storage 610 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

It should be understood that although not shown, other hardware and/or software components could be used in conjunction with component failure prediction system 104. Examples, include, but are not limited to: microcode, device drivers, redundant processing units, and external disk drive arrays, RAID systems, tape drives, and data archival storage systems, etc.

Exemplary embodiments are described herein in detail with reference to the accompanying drawings. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of one or more embodiments may be embodied as a system, method, or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention(s) are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Thus, while there have been shown and described and pointed out fundamental novel features of the inventive system and method as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps that perform substantially the same function in substantially the same way to achieve the same results are within the scope of the invention. It is the intention, therefore, to be limited only as indicated by the scope of the claims appended hereto.

The invention claimed is:

1. A method comprising:
   receiving a first image data set and a second sensor data set, the first image data set being based on images of a first environment, the second data set being measurements taken by sensors of the first environment, the first image data set having a first number of first channels, the second sensor data set having a second number of second channels, the second number of second channels being greater than the first number of first channels;
   training a first image model using the first image data set, the first image model including a plurality of layers, a first layer of the plurality of layers receiving predetermined dimensions and the first number of first channels of the first image data set, subsequent layers of the plurality of layers receiving the output of previous layers, weights of the layers being determined through training the first image model;
   pre-training a second sensor model using the second sensor data set and the weights of the layers that were determined through training the first image model, the pre-training the second sensor model comprising:
      dividing an output of a convolution of predetermined dimensions of the second data set and the second number of second channels to generate different divided outputs to provide to a second plurality of branches;
      for each of the second plurality of branches:
         selecting a third number of the second number of channels, the third number of the second channels being equal to the first number of first channels,
         applying each layer of the plurality of layers using the weights of the layers that were determined through training the first model to the particular divided output of that particular branch,
         determining a particular weight for the particular branch to apply to the output of a last layer of the plurality of layers to generate a first particular branch output;
   fine-tune training the second sensor model using the second sensor data set using the particular weights of the particular branches and defining weights for the plurality of layers, the fine-tune training of the second sensor model comprising:
dividing output of the convolution of predetermined dimensions of the second data set and the second number of second channels to generate different divided outputs to provide to the second plurality of branches,
for each of the second plurality of branches:
applying a first layer of the plurality of layers to the particular divided output of that particular branch,
concatenating output of each particular branch and applying a second layer of the plurality of layers to at least a portion of the concatenated output,
determining a particular weight for each layer of each branch based on the training of the second model,
determining a particular weight for the particular branch to apply to the output of a last layer of the plurality of layers to generate a second particular branch output; and
generating the second model for similar sensors of the second data set, the second model including weights determined in the fine-tune training.

2. The method of claim 1, where the first number of first channels is three.

3. The method of claim 1, where the second data set is LiDAR data.

4. The method of claim 3, wherein the first data set is captured from a camera of the first environment and the LiDAR data is captured of the first environment.

5. The method of claim 1, wherein pre-training the second sensor model further comprises applying an activation function to the output of the convolution of predetermined dimensions of the second data set and applying normalization to an output of the activation function and applying a divided output of the normalization to the second plurality of branches.

6. The method of claim 5, wherein fine-tuning training of the second sensor model further comprises applying the activation function to the output of the convolution of predetermined dimensions of the second data set and applying normalization to the output of the activation function and applying the divided output of the normalization to the second plurality of branches.

7. The method of claim 1, wherein applying the first layer of the plurality of layers to the particular divided output of that particular branch comprises extending the first layer with zeros to accommodate a greater number of second channels, the greater number of second channels being greater than the third number of second channels.

8. The method of claim 1, wherein fine-tuning of the second sensor model comprises applying layers specific to target training task to the second particular branch output for further training.

9. The method of claim 8, wherein the target training task is classification.

10. A non-transitory computer-readable medium readable by at least one processor comprises instructions to configure the at least one processor to perform a method, the method comprising:
receiving a first image data set and a second sensor data set, the first image data set being based on images of a first environment, the second data set being measurements taken by sensors of the first environment, the first image data set having a first number of first channels, the second sensor data set having a second number of second channels, the second number of second channels being greater than the first number of first channels;
training a first image model using the first image data set, the first image model including a plurality of layers, a first layer of the plurality of layers receiving predetermined dimensions and the first number of first channels of the first image data set, subsequent layers of the plurality of layers receiving the output of previous layers, weights of the layers being determined through training the first image model;
pre-training a second sensor model using the second sensor data set and the weights of the layers that were determined through training the first image model, the pre-training the second sensor model comprising:
dividing output of a convolution of predetermined dimensions of the second data set and the second number of second channels to generate different divided outputs to provide to a second plurality of branches,
for each of the second plurality of branches:
selecting a third number of the second number of channels, the third number of the second channels being equal to the first number of first channels,
applying each layer of the plurality of layers using the weights of the layers that were determined through training the first model to the particular divided output of that particular branch,
determining a particular weight for the particular branch to apply to the output of a last layer of the plurality of layers to generate a first particular branch output;
fine-tune training the second sensor model using the second sensor data set using the particular weights of the particular branches and defining weights for the plurality of layers, the fine-tune training of the second sensor model comprising:
dividing output of the convolution of predetermined dimensions of the second data set and the second number of second channels to generate different divided outputs to provide to the second plurality of branches,
for each of the second plurality of branches:
applying a first layer of the plurality of layers to the particular divided output of that particular branch,
concatenating output of each particular branch and applying a second layer of the plurality of layers to at least a portion of the concatenated output,
determining a particular weight for each layer of each branch based on the training of the second model,
determining a particular weight for the particular branch to apply to the output of a last layer of the plurality of layers to generate a second particular branch output; and
generating the second model for similar sensors of the second data set, the second model including weights determined in the fine-tune training.

11. The non-transitory computer-readable medium readable of claim 10, where the first number of first channels is three.

12. The non-transitory computer-readable medium readable of claim 10, where the second data set is LiDAR data.

13. The non-transitory computer-readable medium readable of claim 12, wherein the first data set is captured from a camera of the first environment and the LiDAR data is captured of the first environment.

14. The non-transitory computer-readable medium readable of claim 10, wherein pre-training the second sensor model further comprises applying an activation function to the output of the convolution of predetermined dimensions of the second data set and applying normalization to an output of the activation function and applying a divided output of the normalization to the second plurality of branches.

15. The non-transitory computer-readable medium readable of claim 14, wherein fine-tuning training of the second sensor model further comprises applying the activation function to the output of the convolution of predetermined dimensions of the second data set and applying normalization to the output of the activation function and applying the divided output of the normalization to the second plurality of branches.

16. The non-transitory computer-readable medium readable of claim 10, wherein applying the first layer of the plurality of layers to the particular divided output of that particular branch comprises extending the first layer with zeros to accommodate a greater number of second channels, the greater number of second channels being greater than the third number of second channels.

17. The non-transitory computer-readable medium readable of claim 10, wherein fine-tuning of the second sensor model comprises applying layers specific to target training task to the second particular branch output for further training.

18. The non-transitory computer-readable medium readable of claim 17, wherein the target training task is classification.

* * * * *